Aug. 2, 1960  J. R. ORELIND ET AL  2,947,366
BEET HARVESTER CLOD CRUSHER
Filed May 14, 1958  2 Sheets-Sheet 2

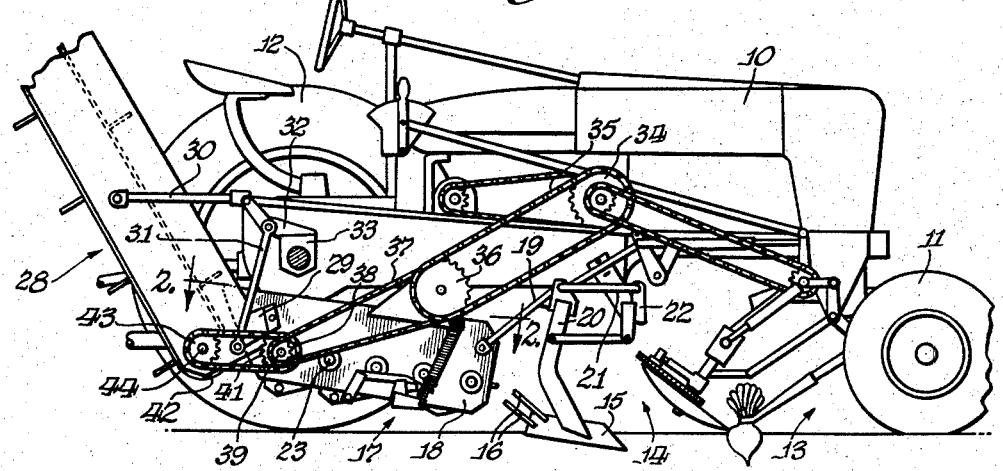
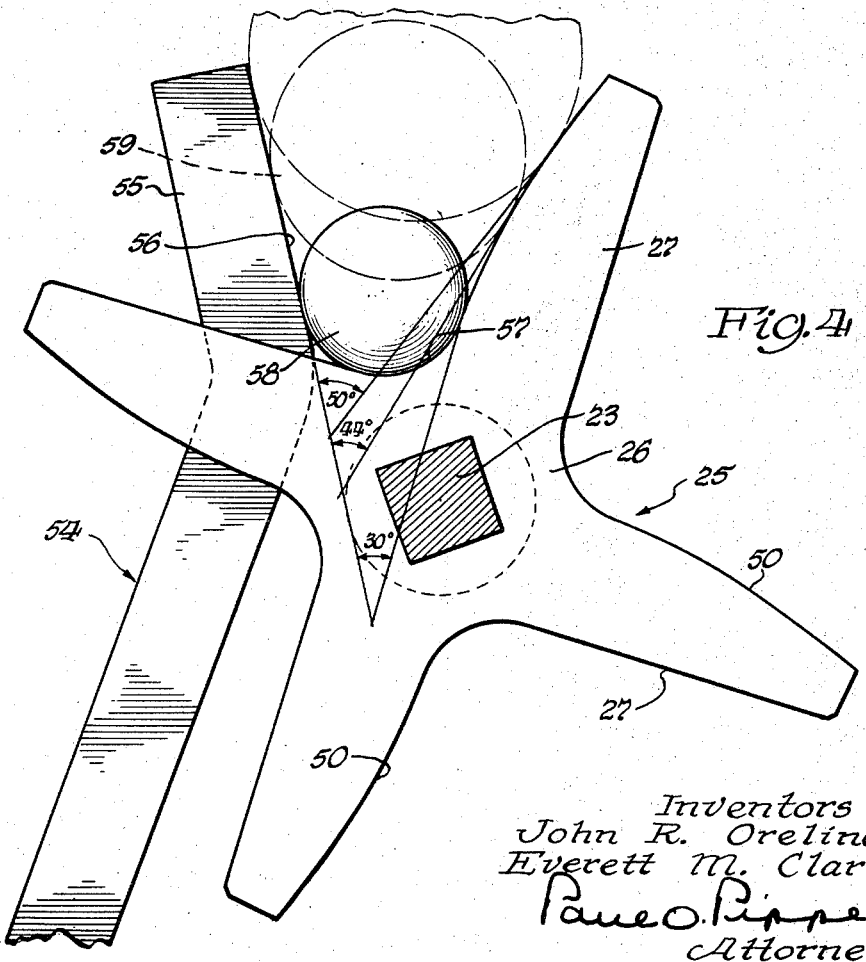

Inventors
John R. Orelind
Everett M. Clark
Paul O. Pippel
Attorney ounited States Patent Office 2,947,366
Patented Aug. 2, 1960

2,947,366

BEET HARVESTER CLOD CRUSHER

John R. Orelind, Wilmette, and Everett M. Clark, Naperville, Ill., assignors to International Harvester Company, Chicago, Ill., a corporation of New Jersey Filed May 14, 1958, Ser. No. 735,293

1 Claim. (Cl. 171—116)

This invention relates to cleaning apparatus for harvested crops such as beets and the like wherein clods of earth and other foreign material are dug with the crop.

In digging and removing beets and the like from the ground, clods of dirt and other debris substantially the size of the beets are also harvested and are loaded and shipped with the beets unless removed. Usually the beets after digging are shaken to remove debris and the latter is allowed to fall to the ground. However, large clods the size and shape of beets frequently survive the shaking and are carried along with the beets to the trucks by which they are shipped to the refinery, and an object of this invention is the provision of improved cleaning apparatus for beets and the like designed to substantially eliminate the foreign matter from the harvested crop.

Another object of the invention is the provision of beet cleaning apparatus adapted to shake excess debris from the harvested beets and incorporating therein means arranged to crush clods of earth and the like substantially without injury to the beets.

Another object of the invention is the provision in beet harvesting machinery, of beet cleaning apparatus adapted to crush clods of earth and trash while taking advantage of the smooth surface of the beet to prevent injury thereto.

A further object of the invention is the provision, in beet treating machinery, of cleaning apparatus including rotatable wheels having arms adapted to strike the beets and advance them toward a receptacle, and in combination therewith relatively stationary arms having a scissoring action with said wheel arms, the angle between the arms being such that when a beet is caught between them, it is expressed outwardly from between the arms substantially without damage, while clods caught between the arms are entrapped and crushed.

Other objects of the invention will become clear from the following detailed description when read in conjunction with the accompanying drawings, wherein:

Figure 1 is a view in side elevation of a tractor with one rear wheel removed showing mounted thereupon portions of a beet harvester having incorporated therein beet cleaning and clod crushing apparatus embodying the features of this invention;

Figure 4 is an enlarged detail showing one of the clod crushing units.

Figure 2:
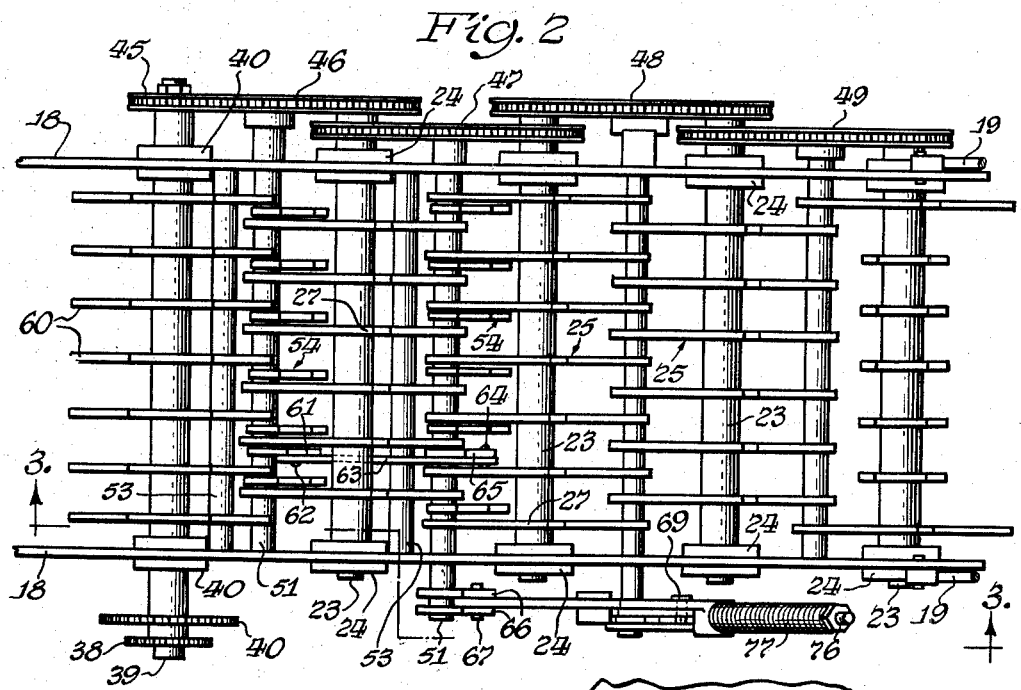
Figure 2 is a plan view on a large scale on the line 2—2 of Figure 1.

In the drawings the numeral 10 designates a tractor having front wheels 11 and rear drive wheels 12, one of which has been removed to reveal some of the elements of a well-known beet harvester mounted on the side of the tractor body. Although, per se, some of the elements of the harvester form no part of this invention, it may be noted that the foliage is removed from the beets by a topper designated at 13. The beets are then removed from the soil by a digger 14 comprising a pair of laterally spaced blades 15. Clods of earth are removed with the beets, the character, quantity and size of the clods being dependent upon the condition and the type of soil, and are led rearwardly and upwardly between guides 16 to a combination cleaner and shaker 17.

Beet cleaner and shaker 17 comprises laterally spaced supporting plates 18, the forward ends of which are pivotally suspended from one or more straps 19 secured to the upper end of the standard 20, which carry the blades 15 and are, in turn, connected by parallel links 21 to a bracket 22 secured to the side of the tractor body. A plurality of longitudinally spaced transverse shafts 23 are rotatably mounted at their ends in bearings 24 carried by supporting plates 18, and affixed to each shaft 23 at laterally spaced locations thereon are a plurality of wheel members 25. Each wheel 25 comprises a hub portion 26 from which project radially, circumferentially spaced arms 27, in the example shown in the drawings, spaced substantially 90° apart.

Figure 3:
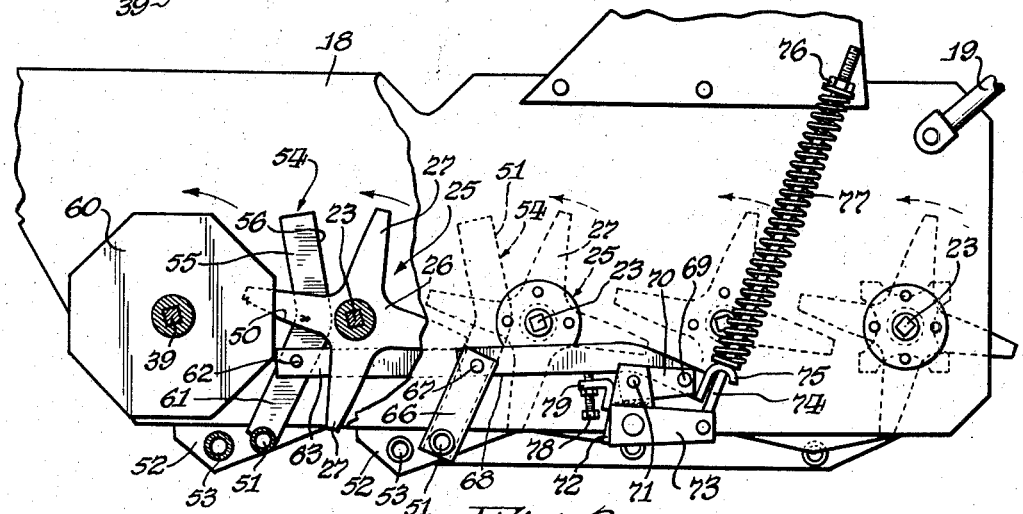
Figure 3 is a section taken on the line 3—3 of Figure 2.

Wheels 25 are driven in the direction of the arrows shown in Figure 3, arms 27 being designed to strike and propel or convey the beets and clods received from the digger 14 rearwardly to an elevator designated at 28. Dirt and debris shaken from the beets by the cleaner apparatus 17 falls therethrough or through the flights of the elevator 28 to the ground, the beets being delivered by the elevator to a receptacle. The lower end of elevator 28 is pivotally connected by one or more brackets 29 to the rear ends of plates 18 and is suspended by links 30 and 31 from a bracket 32 secured to the tractor rear axle housing 33.

The wheels 25 are driven by power derived from the tractor power plant through a sprocket wheel 34 and a drive chain 35 to another sprocket wheel 36 carried by the cleaner and shaker 17. Another drive chain 37 is connected to a sprocket wheel 38 mounted on a shaft 39 carried in bearings 40 mounted in the rear ends of plates 18. The elevator 28 may also be suitably driven by the provision of another sprocket wheel 41 mounted on shaft 39 and connected by a drive chain 42 with a sprocket wheel 43 carried at the end of a shaft 44 mounted at the lower end of the elevator 28.

The other end of shaft 39 is provided with a sprocket wheel 45 which is suitably connected by a series of drive chains 46, 47, 48 and 49 to the wheel shafts 23.

The wheels 25 are substantial duplicates and each arm 27 has a curved leading or beet engaging edge 50 and the angular movement of the arms 27 in the direction of the arrows shown in Figure 3 propels the beets rearwardly toward the elevator 28. Clods of earth and debris which frequently accompany the beets dug from the ground, too hard to be broken by the beating of the arms 27 and too large to fall between the wheels 25 and shafts 23, are carried along to the elevator with the beets. Means are provided by this invention for crushing the clods into smaller size so that the pieces can fall through to the ground and are not carried to the receptacle with the beet. This means comprises, for each of the two rearmost shafts 23 another shaft 51, mounted in brackets 52 forming extensions of and depending from the side plates 18. Brackets 52 also provide anchors for the ends of spacer bars 53 extending between the plates 18.

A plurality of arm members 54, one for each wheel 25 of the adjacent shaft 23 are secured at spaced locations to the shaft 51.

As will be observed in Figure 2, the arms 27 of wheels 25 on adjacent shafts 23 pass closely alongside the adjacent arm 54 of the associated shaft 51 in a scissoring action, and it will also be noted that the wheels 25 of the adjacent shafts 23 are staggered with respect to each other so that they pass on opposite sides of the associated arms 54.

Each arm 54 projects at an angle forwardly from the shaft 51 and its upper end is bent at an angle upwardly and rearwardly to form a blade portion 55 having a beet engaging forward edge 56 in opposing relation to the angularly moving arms 27 of wheel 25. As beets and clods are propelled rearwardly by contact with the arm 27, the clods that are too large to fall through to the ground are entrapped between edges 50 and 56 of arms 27 and 54, respectively. Beets of a size generally considered too small, and clods of a comparable size usually fall back to the ground, while beets of the minimum size considered desirable may fall into the pocket indicated in Figure 4 formed by the members 27 and 54, the pocket being designated by the numeral 57. A beet of minimum size is shown diagrammatically in Figure 4 and designated by the numeral 58. It will also be noted in Figure 4 that edge 56 of blade portion 55 is a substantially straight line, and that a line tangent to the curved surface of leading edge 50 of member 27 forms with it a minimum angle of approximately 30°. It has been found that if the included angle between arms 27 and 54 is not materially less than 30°, the beet designated at 58 will merely provide lubrication for the edges 50 and 56 and that the beet will be expressed or squeezed out between the arms 27 and 54, substantially without damage to the beet. On the other hand, an earth clod of a comparable size to beet 58 will be held between the arms 27 and 54 and crushed thereby.

A larger size beet or clod is designated in Figure 4 by the numeral 59, and it will be observed that the angle made by edge 56 with a line tangent to the curved edge 50 at the point of contact thereof with the beet 59 is 44°. Thus, for a beet or clod of this size and an included angle of 44°, a beet will be expressed outwardly without substantial damage, while a clod will be crushed. The same relationship holds true for beets and clods of other sizes, the curvature of the leading edge 50 of arm 27 being so selected that beets received between the arms will be discharged while clods are crushed and the beets will continue to be conveyed rearwardly until they engage a group of hexagonally shaped solid wheels 60 secured at spaced locations on shaft 39 and forming a bridge between the rearmost wheel 25 and the elevator 28.

While the arms 54 are held relatively stationary with respect to the supporting frame plates 18 of the cleaner 17 under normal operating conditions, stalling and possible damage to the cleaner is avoided by allowing the arms 54 to yield when abnormally hard clods or rocks are encountered. For this purpose the shafts 51 are rotatably or rockably mounted in the frame plates 18 and the two sets of arms 54 on shafts 51 are connected by the provision of an arm 61 secured to the rearmost shaft 51 at a location between the side plates 18, and pivotally connected at 62 to the rear end of a link 63, the forward end of which is pivotally connected at 64 to another arm 65 secured to the forward shaft 51. A pair of arms 66 secured to the outer projecting end of forward shaft 51 is pivotally connected by a pin 67 to another link 68, the forward end of which is bent downwardly and connected to a pin 69 at the end of an arm 70 pivoted at 71 to the upper end of a lug 72 secured to one of the side plates 18 and having a projecting portion 73.

Projection 73 serves as an anchor for the lower end of a rod 74 slidably receivable in an opening provided in a bracket 75 affixed to the forward end of link 68. The upper end of rod 74 is threaded to receive a nut 76 and a spring 77 surrounds the rod between bracket 75 and the nut to hold the parts in the position indicated in Figure 3 with pin 69 approaching centered relationship with pivots 67 and 71.

When a rock or excessively hard clod is entrapped between any pair of arms 27 and 54, the latter is allowed to yield to permit the rock to be thrown out without interfering with the operation of the cleaner. Adjustments are made in the ease with which the arms 54 are allowed to yield by the provision of a threaded bolt 78 receivable in a threaded opening provided in a bracket 79 affixed to lug 72, the end of the bolt 78 being adjustably engageable with the lower edge of link 68.

It is believed that the operation of the beet cleaning and clod crushing apparatus of this invention will be clearly understood from the foregoing description. It should likewise be understood, however, that the invention has been described in its preferred embodiment only, and that modifications may be made therein without departing from the spirit of the invention or the scope of the appended claim.

What is claimed is:

For use in connection with a digger for beets and the like, a cleaning device arranged to receive the beets and clods of earth and debris from the digger, comprising a supporting frame, a horizontal shaft rotatably mounted in said frame, spaced wheels on said shaft, each said wheel including a plurality of radially projecting arms arranged to engage and advance generally horizontally the beets and clods delivered to the cleaning device, and each said arm having a convex beet-engaging edge, a relatively stationary arm mounted in said frame on the side of said shaft opposite the direction from which the beets are received by the cleaning device and extending generally vertically in the path of angular movement of the arms on said wheel, each said wheel arm and its associated stationary arm having a scissoring action with respect to beets and clods caught therebetween, and the angle formed, by the beet-engaging edge of said relatively stationary arm with a line tangent to the convex edge of the other arm at the point of contact thereof with the beets and clods being such that clods are frictionally held between said arms and crushed thereby, while beets are expressed radially outwardly therebetween.

References Cited in the file of this patent

UNITED STATES PATENTS

| | | |
|---|---|---|
| 652,139 | Pedrick | June 19, 1900 |
| 910,601 | Strait | Jan. 26, 1909 |
| 1,997,564 | Albrecht | Apr. 16, 1935 |